April 24, 1928.

W. J. KENT

TESTING MACHINE

Filed April 18, 1927

INVENTOR
William J. Kent
BY
Ernest Hopkinson
ATTORNEY

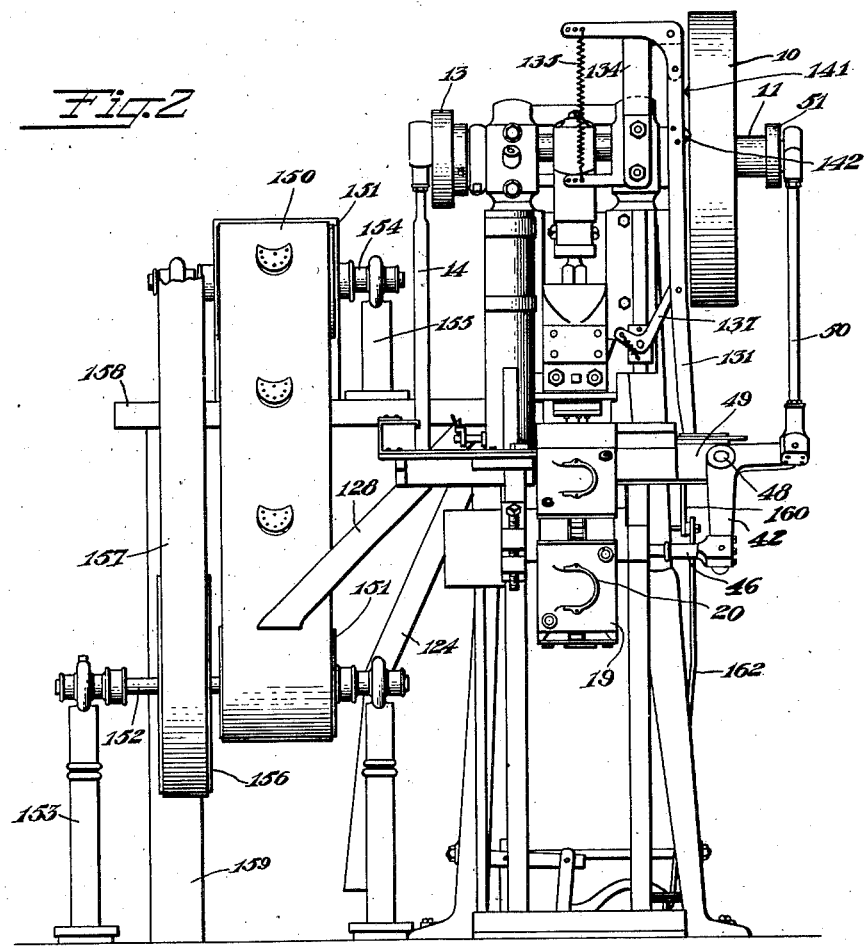
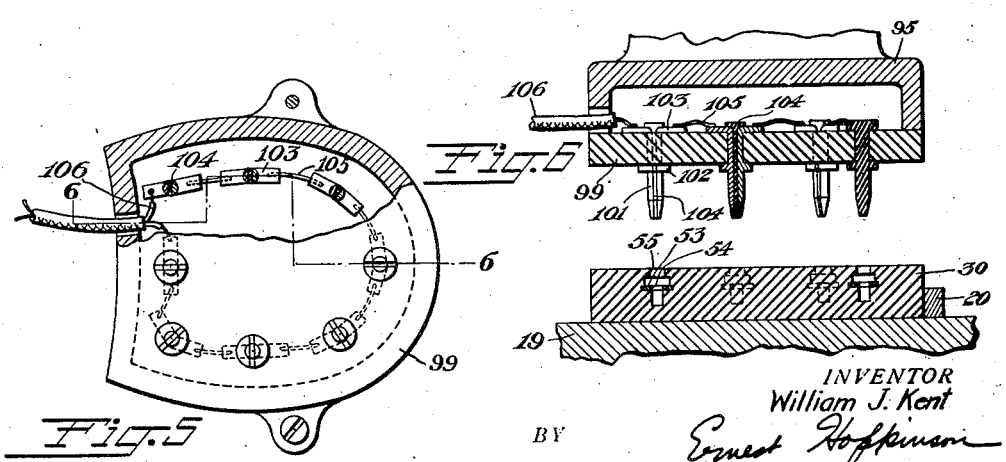

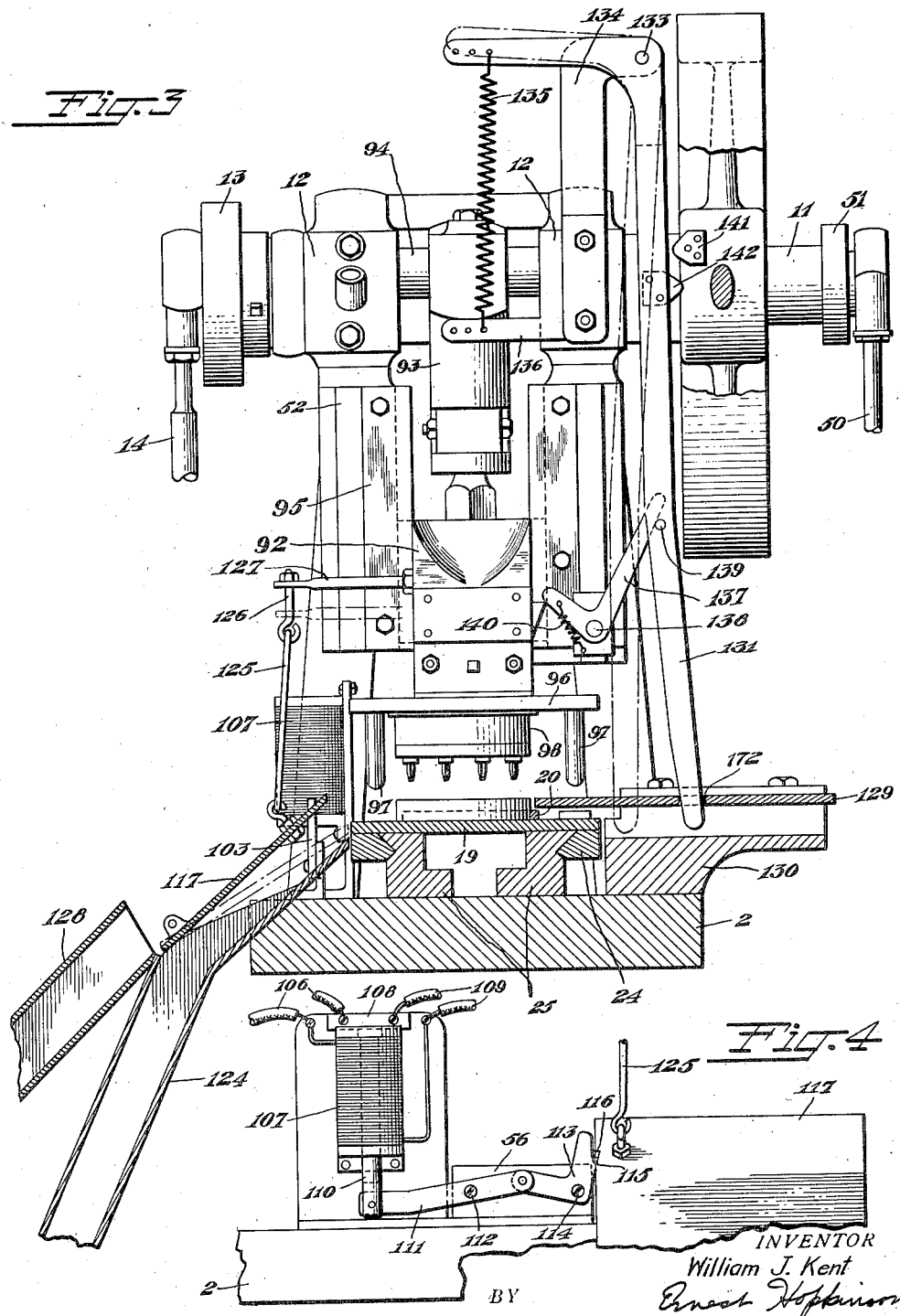

April 24, 1928.
W. J. KENT
TESTING MACHINE
Filed April 18, 1927    5 Sheets-Sheet 4
1,667,420
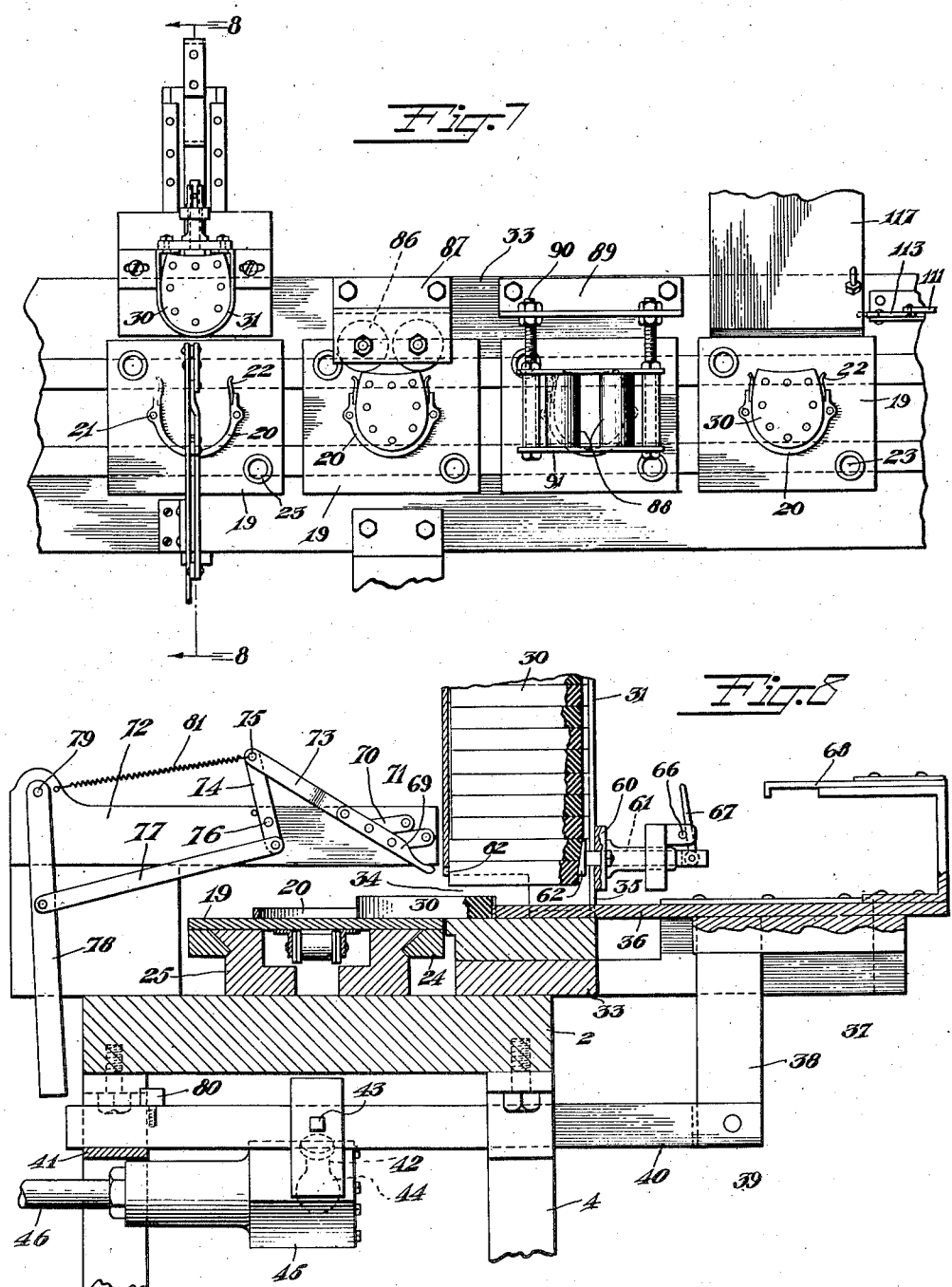
INVENTOR
William J. Kent
BY Ernest Hopkinson
ATTORNEY April 24, 1928.

W. J. KENT

TESTING MACHINE

Filed April 18, 1927

INVENTOR
William J. Kent
BY Ernest Hopkins
ATTORNEY

Patented Apr. 24, 1928.

1,667,420

UNITED STATES PATENT OFFICE.

WILLIAM J. KENT, OF BROOKLYN, NEW YORK, ASSIGNOR TO THE MECHANICAL RUBBER COMPANY, OF CHICAGO, ILLINOIS, A CORPORATION OF NEW JERSEY.

TESTING MACHINE.

Application filed April 18, 1927. Serial No. 184,500.

This invention relates to an apparatus for testing articles and separating defectives therefrom, and more particularly to the testing of rubber heels for proper location of the heel washers therein and segregation of defective heels.

As rubber heels are commonly manufactured, they are provided with a number of individual metal washers which are embedded in the body thereof, these washers being designed to guide the nails, screws or other fastenings, by which the heel is to be secured to a shoe, and to anchor their heads. The washers are positioned in the body of the heel between its top and bottom surfaces. They are designed to be placed on pins in the mold in perfect alignment, but by reason of initial displacement or omission or by displacement during molding, a considerable number of the finished heels are defective with respect to their washers. Misplaced washers interfere with the driving of the nails and consequently render the heel defective. Previously testing of heels to ascertain if the washers have been properly positioned has been accomplished by manually probing each nail hole of the heel.

It is an object of this invention to provide a machine for mechanically testing rubber heels to determine if the washers are present and properly positioned. Another object is to provide a machine for testing a heel for the proper positioning of all its washers in a single operation. It is a further object to mechanically separate those heels in which the washers are accurately positioned from those carrying misplaced washers.

The invention broadly comprises means for accurately positioning a heel opposite the terminals of an electric circuit, and means for pressing the terminals against the heel whereby the circuit is completed through the washers if they are properly positioned. It further comprises automatic means for segregating in two groups the perfect and imperfect heels.

For a detailed disclosure of the invention, reference is had to the accompanying specification and to the drawings, in which latter:

Fig. 2 is an end elevation from the left end of Fig. 1;

Fig. 3 is an enlarged fragmentary end elevation with the bed plate and article chutes shown in section;

Fig. 4 is a detail side elevation of a magnetically operated latch.

Fig. 5 is a detail bottom plan view of the testing head shown partly in section;

Fig. 6 is a transverse sectional view on the line 6—6 of Fig. 5;

Fig. 7 is an enlarged plan view of a portion of the machine, showing particularly the magazine and the positioning rolls;

Fig. 8 is a vertical transverse sectional view on the line 8—8 of Fig. 7 showing the heel being delivered to one of the heel clips;

Figure 1:
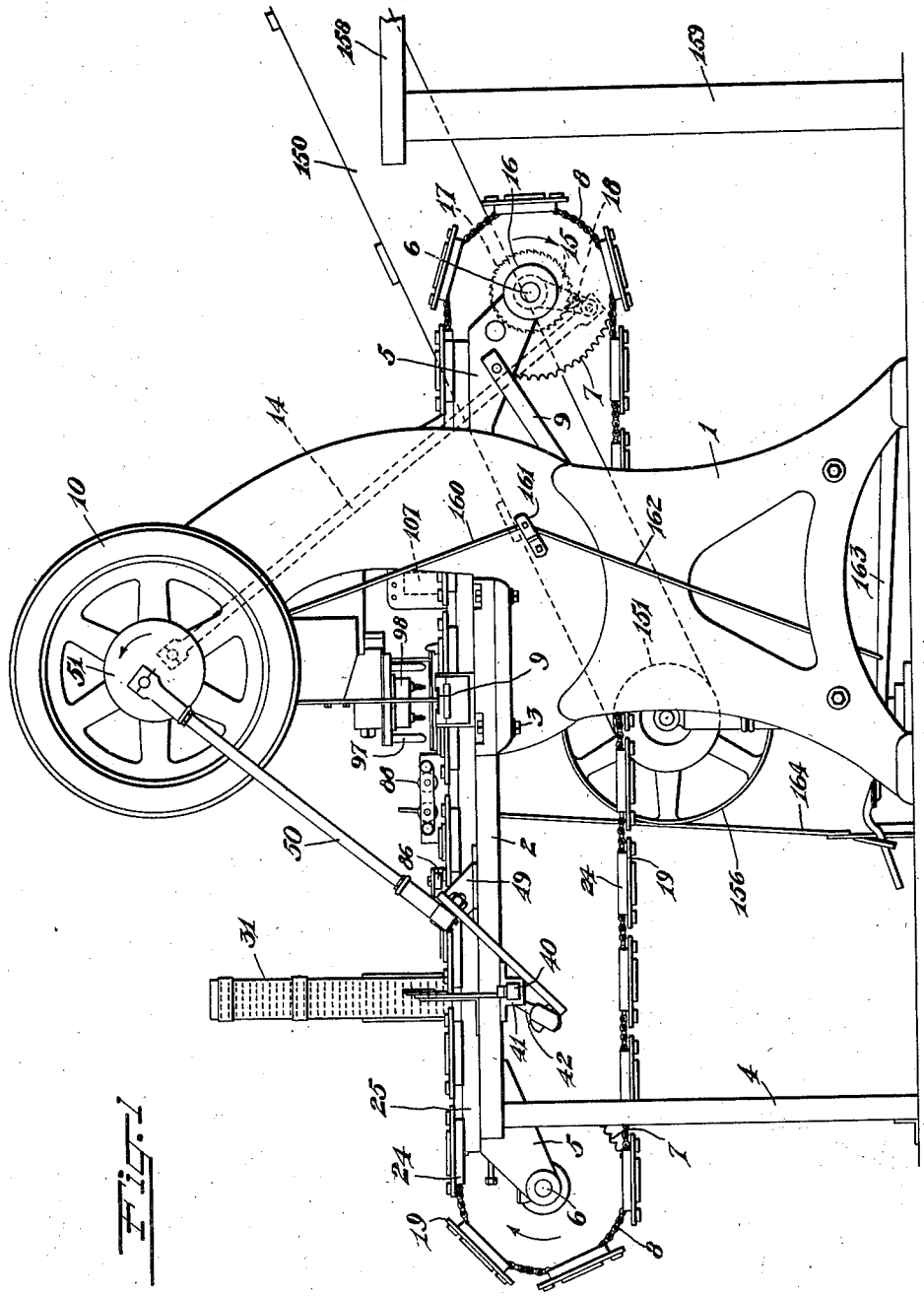
Fig. 1 is a side elevation of the complete machine.
Figure 9:
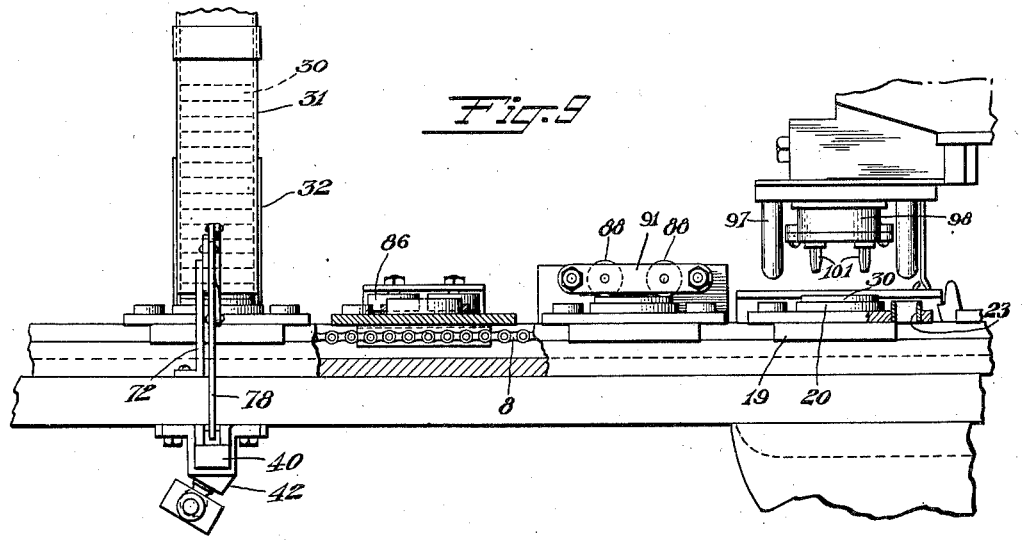
Fig. 9 is a fragmentary side elevation of the elements shown in Fig. 7, part thereof being broken away and other parts being shown in section.

Referring particularly to the drawings, a frame 1 carries a table 2 which is secured thereon by bolts 3 and is further braced by legs 4. Brackets 5 are supported from the ends of the table 2 and carry rotatably mounted therein, shafts 6. Sprockets 7 are rigidly secured to the shafts 6 and the sprockets carry the conveyor chain 8. An arm 9 extending from the bracket 5 to the frame 1 serves as an additional brace for the conveyor. The conveyor is designed to travel intermittently in a clockwise direction as viewed in Fig. 1 and is actuated through a pulley 10 which latter is connected by a belt (not shown) with a source of power. The pulley 10 is rigidly mounted on shaft 11 which latter is carried in suitable bearings 12 on the upper part of the frame 1. Rotation of the shaft 11 causes rotation of the eccentric 13, which is rigidly carried thereby. A connecting rod 14 is pivotally attached at one end to the eccentric and at its other end it is pivotally connected to a lever arm 15 pivoted to the shaft 6. A ratchet wheel 16 is rigidly carried by the shaft 6 and the teeth 17 of the wheel are designed to be engaged by a pawl 18 which is pivotally mounted upon the lever arm 15. The pulley 10 is rotated in a counter-clockwise direction (as viewed in Fig. 1) and in its rotation it causes the eccentric 13 to reciprocate the rod 14 with the pawl 18 alternately engaging the teeth 17 of the ratchet wheel and causing partial rotation of the same. Reverse movement of the feed rod causes the latch to merely slide over the protruding surfaces of the teeth.

The conveyor chain 8 carries a plurality of plates 19 each of which is provided with a U-shaped clip 20 designed to receive and hold a heel. The clip is secured to the plate by bolts 21 and it carries at its outer ends spring gripping members 22. Each plate is provided with openings 23 for a purpose to be later described. Projecting ribs 24 are carried upon the under side of the plates 19 designed to have sliding dovetail engagement with guides 25, which latter are carried rigidly by the table 2. The rubber heels 30 are stacked in a column in a receptacle or magazine 31 which is disposed at one side of the conveyor and is secured by brackets 32 to a support 33. The support is carried rigidly upon the table 2. In operation the bottom heel rests on the support 33. A slot 34 extends through the portion of the wall of the magazine adjacent the plates 19, the slot being of sufficient size for a heel to be passed there through. In the opposite wall of the receptacle a similar slot 35 is provided of sufficient size to receive the ejector 36. The base portion 37 of the ejector is desired to slide in ways in the support 33.

Figure 10:
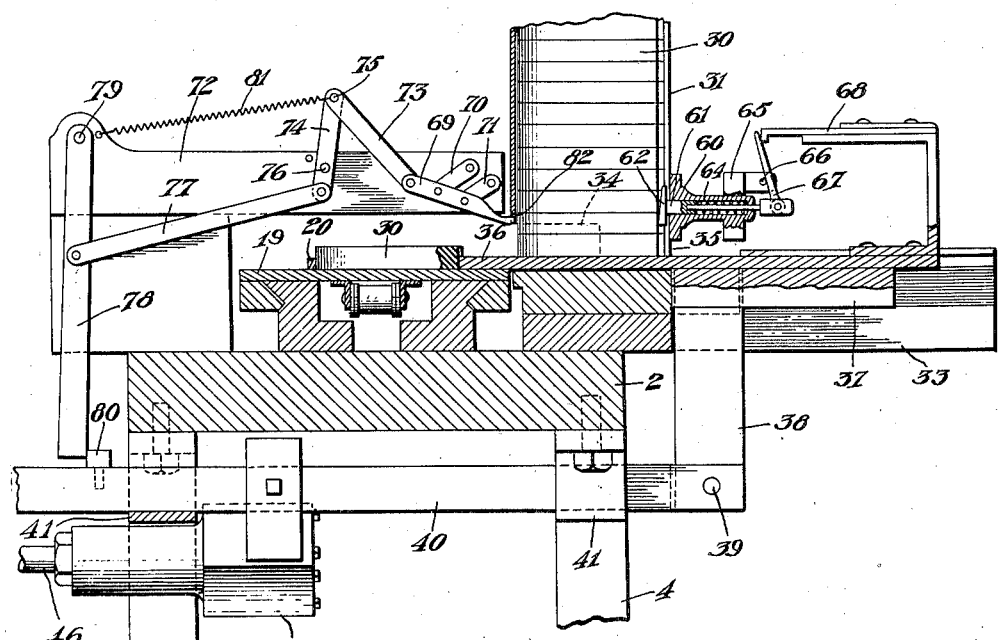
Fig. 10 is a view similar to that shown in Fig. 8 after a heel has been positioned in the clip and a column of heels in the magazine has been allowed to drop.

Reciprocating movement of the ejector to force a heel from the magazine into a heel slip is accomplished through actuation of the arm 38 which extends rigidly from the base 37 of the ejector. A link 40 is connected at 39 to the arm 38, the link being slidably mounted in spaced ways 41. Between these ways a ball arm 42 is rigidly secured to the link 40 by a pin 43, the ball 44 fitting into socket member 45 which latter is attached to the rod 46. A bell crank lever 47 (Fig. 2) is pivoted to the enlarged end of the rod 46 by a ball and socket connection or otherwise. The bell crank is pivoted at 48 upon the bracket 49 which extends from table 2 and its opposing end is pivotally connected with a link 50, which latter is pivotally secured to the eccentric 51 mounted on the opposite end of shaft 11 from eccentric 13. Rotation of the shaft 11 causes reciprocation of the link 50 and actuation of the ejector 36. The ejector has a range of travel from the position shown in Fig. 10, in which it has forced the heel within an adjacent clip 20, to a position in which it is withdrawn from the opposite side of the magazine. The purpose of the ejector is to intermittently pass through the magazine forcing the end heel from the magazine into a heel clip.

As the end heel is ejected from the magazine, the adjoining heel is held from falling upon the surface of the ejector by the following arrangement of parts. A support 60 is rigidly secured to the outer surface of the magazine and carries a plunger 61 which extends through the wall of the magazine and is provided upon its inner end with a head 62 which tapers from its upper side to a thickened lower portion. The head of the plunger is normally pressed by a spring 64 against the heel adjacent the bottom heel to wedge the same against the opposite wall of the magazine and thereby maintain the column from dropping into the space left by the removal of the bottom heel. A projection 65 is carried by the support 60 and mounted thereon is a stop 66. A lever 67 is pivoted to the plunger and is adapted to rest against the stop 66. This lever is so positioned as to be engaged by the arm 68 which extends rigidly from the base 37 of the ejector and engages the lever 67 when the ejector has reached the limit of its forward stroke. The pressure of the arm 68 serves to force the plunger with its attached head 62 backward, thereby releasing the heel which was pressed between the head of the plunger and the opposing wall of the magazine. The column of heels is now free to drop down upon the ejector 36. When the travel of the ejector 36 is reversed, the arm 68 ceases to press against the lever 67 and the spring 64 is permitted to again force the plunger head 62 against the adjoining heel. As the ejector is drawn backward, the bottom heel merely slides upon the surface thereof until the ejector is completely withdrawn from the magazine at which time the heel drops upon the surface of the support 33 and the operation is repeated. In stacking the heels in the magazine, they are positioned with their rear portion facing the plunger head.

The surface of a freshly molded heel may be somewhat tacky, and in order to counteract any tendency of the lower heel to adhere to the surface of the magazine, a kicker 69 is provided which is designed to strike the bottom heel to loosen the same. The kicker is pivotally mounted on two supporting arms 70 and 71 which in turn are pivoted to a bracket 72 carried by the table 2. The rear end of the kicker 69 has pivotal connection with a link 73 which in turn is pivoted to a link 74 by a pin 75 and this link is pivoted at 76 to the bracket 72. The opposite end of the link 74 is pivotally connected with the link 77 which latter is pivoted to the lever 78. Lever 78 has swinging engagement with the bracket 72 through a pin 79. The lower end of lever 78 is so positioned as to be intermittently engaged by a lug 80 on link 40 during backward and forward movement of the link. Spring 81 connects the pivot pin 75 with the support 72, tending to normally pull the kicker away from the magazine. Engagement of the lug 80 with the lever 78 forces the end of kicker 69 forwardly through the slot 82 in the magazine against the lowermost heel to knock the same loose from the magazine, the kicking action occurring immediately after the pressure of the head 62 of the plunger has been withdrawn from the heels.

When a heel has been placed within a heel clip upon the carrier, it must be accurately positioned therein. The carrier is conducted through the first step of its intermittent motion which brings the heel to a position opposite the rolls 86. These rolls are carried on a bracket 87 which extends outwardly from the support 33 over the plates 19. The rolls serve to push the heel tightly against the walls of the clip so that it is positioned accurately both transversely and longitudinally of the carrier.

The next step of intermittent travel of the carrier brings the heel beneath a pair of rolls 88. These rolls are held horizontally from a bracket 89 attached to the support 33, bolts 90 carrying the supporting frame 91 of the rolls in adjustable position. The rolls bear against the upper surface of the heel, firmly pressing the same against the plate 19.

The succeeding forward movement of the carrier brings the heel into position directly under the reciprocating head 92 where it is to be tested to ascertain if the washers are correctly positioned in the heel. The head is mounted at the base of connecting rod 93 which latter is connected through suitable bearings with the crank 94. The crank 94 extends from the shaft 11 and serves to carry the connecting rod in vertical reciprocating movement. The head 92 travels in guides 95 attached to suitable frames 52 extending beneath the bearings 12. At the base of the head 92 there is secured a frame 96 which carries projecting guide pins 97 adapted to slide into the openings 23 of the plate 19. This arrangement insures the accurate positioning of the plate 19 with respect to the testing head 98 which is carried at the base of the sliding head 92. Testing head 98 is provided with a recess on its lower surface (see Figs. 5 and 6) and a plate 99 of slate or other suitable insulating material is detachably secured to the same. A plurality of contact fingers project from the plate 99 in the same spaced relation as the washers of the heel to be tested so that when the assembly is pressed into engagement with a properly positioned heel, the tapered ends of the fingers will partially protrude through the metal washers 53 of the heel 30 if the washers are all properly located. The metal washers are provided with a hole 54 and are embedded in the heel so that when properly positioned, the hole 54 coincides with the nail holes 55 of the heel. Each finger comprises two arms or elements 101 of electrically conductive material such as copper, etc. held upon the plate by flanges 102 and 103. The arms are insulated from each other by a layer of insulation 104 of rubber composition or other suitable material. The fingers are connected in a series arrangement by electrical conductors 105, each conductor being connected with flanges 103 of different fingers so that all of the fingers are connected in series, the electric circuit being broken in each finger by the strip of insulation. Current is conducted to and from the series of fingers through conductors 106 attached to the end fingers of the series. These conductors pass through an opening in the wall of the testing head 98 and one leads to one terminal of a solenoid 107 mounted on table 2 and the other is connected to an insulated conducting plate 108, while wires 109 lead from the opposite terminal of the solenoid and from the plate 108 to a source of current.

The core 110 of the solenoid is adapted to reciprocate as the solenoid is energized and deenergized and consequently it causes pivotal movement of the link 111 about pivot 112. Link 111 is loosely connected to one arm of a bell crank 113 which pivots at 114 to a bracket 56. The other arm of the bell crank is provided with a shoulder 115 which is adapted to engage with a shoulder 116 of the door 117. When the electric circuit is closed through contact of all the fingers 101 with perfectly positioned metal inserts of the rubber heel, the solenoid is activated to cause the shoulder 115 of the bell crank to be withdrawn from engagement with the shoulder 116 of the door. The door 117 is hingedly connected to a chute 124 and is connected by links 125 and 126 with a rod 127 which extends rigidly from the head 92, the link 126 having a lost motion connection with rod 127. Downward movement of the sliding head 92 frees the door 117 from support by links 125 and 126, but the door is still held by bell crank 113 in position to leave chute 124 open. Activation of the solenoid while the head is depressed, withdraws the bell crank from engagement with the door 117 so that it drops about its pivot closing the passage of the chute 124. While in this position, the upper portion of the door serves as a floor for the passage of a heel to the chute 128. Elevation of the head 92 draws the door 117 to its open position again where it is reengaged and held by the bell crank 113. The heel is tested by lowering the fingers 101 into the openings 55 and if all the washers are correctly positioned the solenoid is actuated to automatically effect closing of the chute 124, while if any washer is missing or displaced the circuit through the solenoid remains open and hence the door of chute 124 remains open.

Upward movement of the head 92 leaves the heel free to be removed. This is accomplished through a pusher 129 which is suitably secured in a slot in the support 130 which in turn is rigidly carried by the table 2. Pusher 129 is so mounted as to have sliding movement in the slot with its forward end adapted to engage the heel above the heel clip 20 and to shove the heel to a position from which it will slide into one or the other of the chutes. The pusher is actuated by a lever 131 which engages an opening 132 in the pusher. Lever 131 is in the form of a bell crank pivoted at 133 to a brace 134 extending up from the bearing 12. The other end of the lever 131 is attached to a spring 135 which connects it with an arm 136 carried by the bearing 12. The action of the spring is to normally maintain the arm of lever 131 extending outwardly with the pusher in its rearward position. Auxiliary means for maintaining the lever in its outward position comprises a weighted lever 137 which is pivoted at 138 to the support 52 and bears against a pin 139 projecting from the lever 131. To maintain the lever 137 partially balanced, a spring 140 connects the free end thereof with the support 52. Intermittent swinging movement of the lever 131 is effected by the engagement of a tapered lug 141 on the pulley 10 with a lug 142 upon the lever 131. It will be seen that in the case of a defective heel the door 117 is never lowered and therefore the pusher 129 can eject the heel into chute 124 after the head 98 is freed from the heel. In the case of a perfect heel the solenoid releases the door 117 and the latter drops to deflect the heel into chute 128, and due to the lost motion connection of the parts 126 and 127 the door is not raised until after the heel has been ejected.

The chute conducts the heels to conveyor 150, which is carried by pulleys 151. One of these pulleys is mounted rigidly upon a drive shaft 152 which is carried by suitable standards 153. The other pulley is mounted upon the shaft 154 carried by standards 155 which in turn are rigidly secured to the table 158. The supports for the table 158 are the legs 159. The shaft 152 carries a pulley 156 driven by belt 157. The conveyor serves to withdraw the perfect heels to a position from which they can be conveniently gathered by the operator. The defective heels passing through chute 124 can be collected in any suitable receptacle.

Application or withdrawal of power to the testing machine is effected through a clutch mechanism (not shown) of standard design which coacts with the pulley 10. A lever 160 is connected to the clutch at one end and at its other end with an arm 161 which is pivoted upon the frame 1. A second lever 162 leads from the arm 161 to a foot pedal 163. In case it is not convenient to press the pedal with the foot, a hand lever 164 is provided secured at one end to the foot pedal. Any other suitable control mechanism may be used.

In the operation of the machine, rubber heels are fed into the magazine 31 forming a column with the rear portion of the heels facing toward the plunger head 62. The bottom heel rests against the table 33. The clutch is thrown into engagement with the pulley wheel 10 and the conveyor chain 8 in its intermittent travel brings one of the plates 19 with its heel clip 20 directly opposite the opening 34 at the base of the magazine where it remains for a period. Ejector 36 now operates to force the lowest heel out of the magazine into the heel clip 20, after which the ejector is withdrawn from the magazine. At the time the ejector is forcing the heel into the heel clip, the arm 68 is operating upon lever 67 to withdraw the plunger 61 so as to permit the column of heels to drop in the magazine. At the same time the lug 80 actuates the kicker 69 to loosen the heel which had been pressed against the wall of magazine 31, thereby leaving the column of heels free to drop. The heel is then carried by the intermittent movement of the conveyor successively past the rolls 86 and 88 to accurately locate the heel in the clip. Further intermittent travel of the heel carries it beneath the testing plate 98 and while in this position the plate descends, pressing the contact fingers into the holes of the heel. If the required number of metal washers are present and properly positioned, the tapered tips of the fingers will pass through the nail holes in the heel and the conducting arms 101 of each finger will contact with a corresponding metal washer, thereby closing the circuit through the fingers. The resulting current of electricity now activates the solenoid whereby the latch 113 is withdrawn from engagement with the door 117 which immediately descends to close the chute 124. The head 98 then rises to release the heel and in its rise actuates pusher 129 which ejects the heel from clip 20, the heel sliding across door 117 into chute 128 and thence on to conveyor 150. In the further upward movement of head 98 the rod 127 lifts door 117 through the lost motion connection 125, 126 and the stop 113 is reset. If any of the washers are missing or displaced in the heel the circuit is not closed and door 117 therefore remains in elevated position so that when the heel is ejected from its clip, it enters chute 124 and may be collected in any desired manner.

By the device described, rubber heels can be mechanically tested and sorted by an accurate, rapid and inexpensive procedure. While the invention has been disclosed in a specific embodiment for testing rubber heels, it is evident that it is applicable for use with other articles, and it is not desired to limit the scope of the appended claims otherwise than as required by the prior art.

Having thus described my invention, what I claim and desire to protect by Letters Patent is:

1. In a machine for testing the location of electrically conductive inserts in a relatively non-conductive material, means for positioning the material, a contact device comprising a plurality of conductors forming part of an open single electrical circuit, and means for relatively moving said contact device and material to a position where properly located inserts in the material may close the circuit through said conductors.

2. In a heel washer testing machine, conducting means adapted to enter all the nail holes of a heel and contact with properly positioned washers in said holes, said means forming a normally open part of an electric circuit, and means for inserting said conducting means in the nail holes of a heel, whereby a complete set of properly positioned washers may close said circuit.

3. In a heel washer testing machine, a plurality of conducting means adapted to enter all the nail holes of a heel and contact with properly positioned washers therein, said conducting means being connected in series arrangement with an electric circuit and each of them normally forming a break in said circuit, and means for simultaneously inserting all of said conducting means in the nail holes of a heel, whereby a complete set of properly positioned washers may close said circuit.

4. In a heel washer testing machine, a plurality of conducting means adapted to enter all the nail holes of a heel and contact with properly positioned washers therein, said conducting means being connected in series arrangement with an electric circuit and each of them normally forming a break in said circuit, means for simultaneously inserting all of said conducting means in the nail holes of a heel, whereby a complete set of properly positioned washers may close said circuit, and means governed by the closing of said circuit for separating perfect from imperfect heels and discharging them from the machine.

5. A testing machine comprising a support for an electrically non-conductive article having electrically conductive inserts, intermittently operating means for positioning the article upon the support, terminals of an electric circuit, means for relatively moving the support and terminals to contact the terminals with the inserts if properly positioned to close the circuit, means for removing the article from the support, and means governed by said circuit for separating articles having properly positioned inserts from the remainder.

6. A testing machine comprising terminals of an electric circuit, a support, means for positioning an electrically non-conductive article having electrically conductive inserts against the support in predetermined position opposite said terminals, means for contacting the terminals against the article to close the circuit through the inserts when properly positioned, means for removing the article from the support, and means governed by the closing of said circuit for delivering the articles in different paths.

7. A testing machine which comprises a plurality of series arranged spaced pairs of terminals of an electric circuit, a support, means for feeding upon the support an electrically non-conductive article having correspondingly spaced electrically conductive inserts, means for accurately positioning the article upon the support opposite the terminals, means for relatively moving the terminals and support to cause the terminals to contact with all the inserts of the article if present and properly positioned to thereby close the circuit, means for removing the article from the support, and means governed by the closing of the circuit for determining the path of travel of the article when removed.

8. A device for testing the position of electrically conductive inserts in electrically non-conductive articles comprising a frame, a plurality of series connected pairs of spaced terminals extending from the frame and forming part of an open electric circuit, the pairs of terminals being spaced apart on the frame the distance the properly positioned inserts are spaced apart on the article.

9. A testing device for articles having spaced electrically conductive inserts, comprising a frame, a plurality of fingers carried by the frame said fingers having the same spacing and relative arrangement as the properly positioned inserts on the article, each of said fingers comprised of a pair of electrically conductive elements in spaced relation, conductors extending from the elements of different fingers connecting all of them in series with a gap between each pair of elements, and a conductor leading from each of the end elements of the series adapted to be connected with an electric circuit.

10. A testing device comprising a support, a plurality of fingers extending from the support in spaced relation, each finger comprising elements of electrically conductive material insulated from each other, and conductors connecting elements of different fingers and adapted to be connected with a source of electricity whereby closing the gap between the arms of each of the fingers with a conductor completes an electric circuit through the fingers.

11. In a machine for testing the locations of apertured electrically conductive inserts in a relatively non-conducting material, in combination, means for intermittently positioning the material at a predetermined location, testing means comprising a plurality of divided conductors forming part of a closed electrical circuit excepting for said division and adapted to be introduced into the apertures in said inserts whereby to complete the circuit, and means for relatively moving said material and said testing means.

Signed at Chicago, county of Cook, State of Illinois, this 12 day of April, 1927.

WILLIAM J. KENT.